United States Patent [19]
Oltean et al.

[11] Patent Number: 5,337,874
[45] Date of Patent: Aug. 16, 1994

[54] METHOD/SYSTEM FOR DETERMINING CLUTCH TOUCH POINT

[75] Inventors: Jerry M. Oltean, Windsor, Canada; William J. Mack, Clarkston, Mich.

[73] Assignee: Eaton Corporation, Cleveland, Ohio

[21] Appl. No.: 35,124

[22] Filed: Mar. 19, 1993

[51] Int. Cl.⁵ .............................................. F16D 13/75
[52] U.S. Cl. .................................................. 192/111 A
[58] Field of Search ........................ 192/11 A, 0.033

[56] References Cited

U.S. PATENT DOCUMENTS

| | | | |
|---|---|---|---|
| 4,081,065 | 3/1978 | Smyth et al. | 192/0.076 |
| 4,361,060 | 11/1982 | Smyth | 74/866 |
| 4,440,279 | 4/1984 | Schreiner | 192/111 A X |
| 4,629,045 | 12/1986 | Kasai et al. | 192/0.052 |
| 4,646,891 | 3/1987 | Braun | 192/0.032 |
| 5,029,678 | 7/1991 | Koshizawa | 192/111 A X |

FOREIGN PATENT DOCUMENTS 0193416 8/1989 Japan .................... 192/111 A

*Primary Examiner*—Rodney H. Bonck
*Attorney, Agent, or Firm*—Howard D. Gordon

[57] ABSTRACT

A method/system for updating, between system calibration operations, the value (134') of a monitored control parameter corresponding to clutch incipient engagement is provided. At calibration, the initial values of the parameter corresponding to full engagement (124), incipient engagement (130) and the difference therebetween (132) are determined, and thereafter, the updated value of the parameter corresponding to clutch incipient engagement is determined as a function of a current value (124') of the parameter corresponding to clutch full engagement and the memorized value of the difference (132).

14 Claims, 4 Drawing Sheets

METHOD/SYSTEM FOR DETERMINING CLUTCH TOUCH POINT

BACKGROUND OF THE INVENTION

1. Field of the Invention

The present invention relates to a method/system for determining the touch point of a controlled vehicular master clutch, and, more particularly, relates to a method/system for tracking the value of clutch control parameter (such as actuator displacement) corresponding to clutch touch point between system calibrations (as may occur at vehicle start up) without requiring an actual system recalibration operation.

2. Description of the Prior Art

Automated vehicular master clutch systems and fully or partially automated mechanical transmission systems and the automatic controls for the master clutches thereof are known in the prior art as may be seen by reference to U.S. Pat. Nos. 3,478,851; 3,752,284; 4,019,614; 4,038,889; 4,081,065; 4,361,061; 4,401,200; 4,508,625 and 4,828,093, the disclosures of which are hereby incorporated by reference.

Briefly, in such automated systems, various drive line operations, including the engagement and disengagement of the master friction clutch, are automatically controlled by a control system, including a central processing unit, based upon certain measured, sensed, stored and/or calculated input parameters. Typically, the input parameters include engine speed, throttle position, transmission input and/or output shaft speed, vehicle speed, current engaged gear ratio, application of the brakes, condition of the clutch actuator and the like.

For automatic clutch control, during normal operation, when starting from at rest or operating at a very low speed, the master friction clutch is modulated between fully disengaged and fully engaged conditions, i.e. is partially engaged, according to certain input parameters and logic rules. In one type of automated start-from-stop system, the clutch is modulated to maintain the engine speed at a set value above idle speed and/or to achieve smooth starts. Typically, the set engine speed value is throttle position modulated to provide appropriate starting torque and the clutch is moved toward engagement and disengagement, respectively, as the engine speed increases above and falls below, respectively, the set engine speed value. In another system, see above mentioned U.S. Pat. No. 4,081,065, the clutch is modulated in accordance with throttle position, engine speed and engine acceleration.

In such automated systems, the controlled clutch is quickly moved from a fully disengaged condition to almost the incipient engaged condition (i.e. the "touch point") and then modulated to full engagement. The term "incipient engagement" of the master clutch refers to the clutch condition wherein the friction surfaces are almost or just at the point of contact.

Movement of the clutch actuators from the fully disengaged to the incipient engagement position in any manner other than the fastest possible manner is undesirable as control of the system, i.e. control of engine and/or input shaft speed, by varying amount of clutch engagement (i.e. slip) is not possible during this portion of actuator movement and delays in achieving at least incipient engagement make closed loop control of the system more difficult.

Failure to periodically monitor and update the point of incipient engagement, as determined by a monitored clutch actuator parameter, such as actuator pressure and/or a lever position, is undesirable as wear of the friction surfaces and/or mechanical actuator members, misadjustments of the mechanical members, and especially changes in clutch operating temperatures, can cause a relatively large variance in the value of the actuator parameter corresponding to incipient engagement.

Various calibration routines to determine the value of a control parameter corresponding to incipient engagement are known in the prior art, see for example U.S. Pat. No. 4,646,891, the disclosure of which is incorporated herein by reference. Such calibrations often involve shifting to a transmission neutral, possibly applying an inertia brake or input shaft brake, slowly engaging the clutch and then watching for signals assuming a value indicative of incipient/initial engagement, and thus require that the vehicle be incapacitated during the calibration. Such calibrations are often performed at vehicle start-up and/or only periodically. Between calibrations, the value of the monitored control parameter indicative of incipient engagement was assumed to remain substantially constant.

If, between calibrations, the operating temperature of the clutch changed significantly, the clutch experienced significant wear and/or the clutch operation mechanism experienced significant wear and/or deformation, then the last calibrated control parameter value assumed to correspond to incipient engagement might be significantly inaccurate resulting in degradation of the control of the controlled master clutch. In practice, as calibration operations were usually performed at least daily, changes in clutch operating temperatures accounted for much of the inaccuracies.

SUMMARY OF THE INVENTION

In accordance with the present invention, the drawbacks of the prior art have been minimized or overcome by the provision of a control system/method for accurately tracking the value of the monitored control parameter indicative of master clutch incipient engagement between clutch system calibrations. The above is accomplished by, during the clutch calibration operation, determining and memorizing the value of the monitored clutch control parameter at full clutch engagement condition and at clutch incipient engagement condition. The difference between these two values of the monitored clutch control parameter is memorized. Thereafter, the updated current value of the controlled clutch parameter corresponding to incipient engagement is taken as the current value of the monitored clutch control parameter at the fully engaged condition, which can be constantly monitored without the requirement of disabling the system, plus the memorized difference between the initially determined values of the monitored clutch control parameter corresponding to the fully engaged and the incipient engagement conditions. Briefly, it has been found, that the difference in the value of the monitored clutch control parameter between the fully engaged and the incipient engaged condition remains relatively constant over the relatively large variations of operating temperature experienced by a vehicular master clutch from cold start-up to the running conditions thereof. This is especially useful if the monitored parameter is indicative of actuator displacement. As indicated above, it has been found, that the change in clutch operating temperature provides the largest difference in the change in value of the monitored clutch control parameter experienced in between system calibration operations.

Accordingly, it is an object of the present invention to provide an automatic clutch control system wherein the control has at least one modulated engagement mode wherein the clutch is caused to move rapidly in an unmodulated manner from the fully disengaged to the incipient engaged position, and wherein the value of a monitored control parameter corresponding to the point of incipient engagement of the control clutch is determined in a system calibration operation performed only periodically and thereafter, in between system calibration operations, the updated current value of the monitored control parameter corresponding to clutch incipient engagement is determined as a function of the currently determined value of the monitored controlled parameter at the clutch fully engaged position and the value of the difference in the values of the monitored controlled parameter between the clutch fully engaged and the clutch incipient engaged condition as determined during the latest system calibration operation.

This and other objects and advantages of the present invention will become apparent from a reading of the detailed description of the preferred embodiment taken in connection with the attached drawings.

DESCRIPTION OF THE PREFERRED EMBODIMENT

Figure 1:
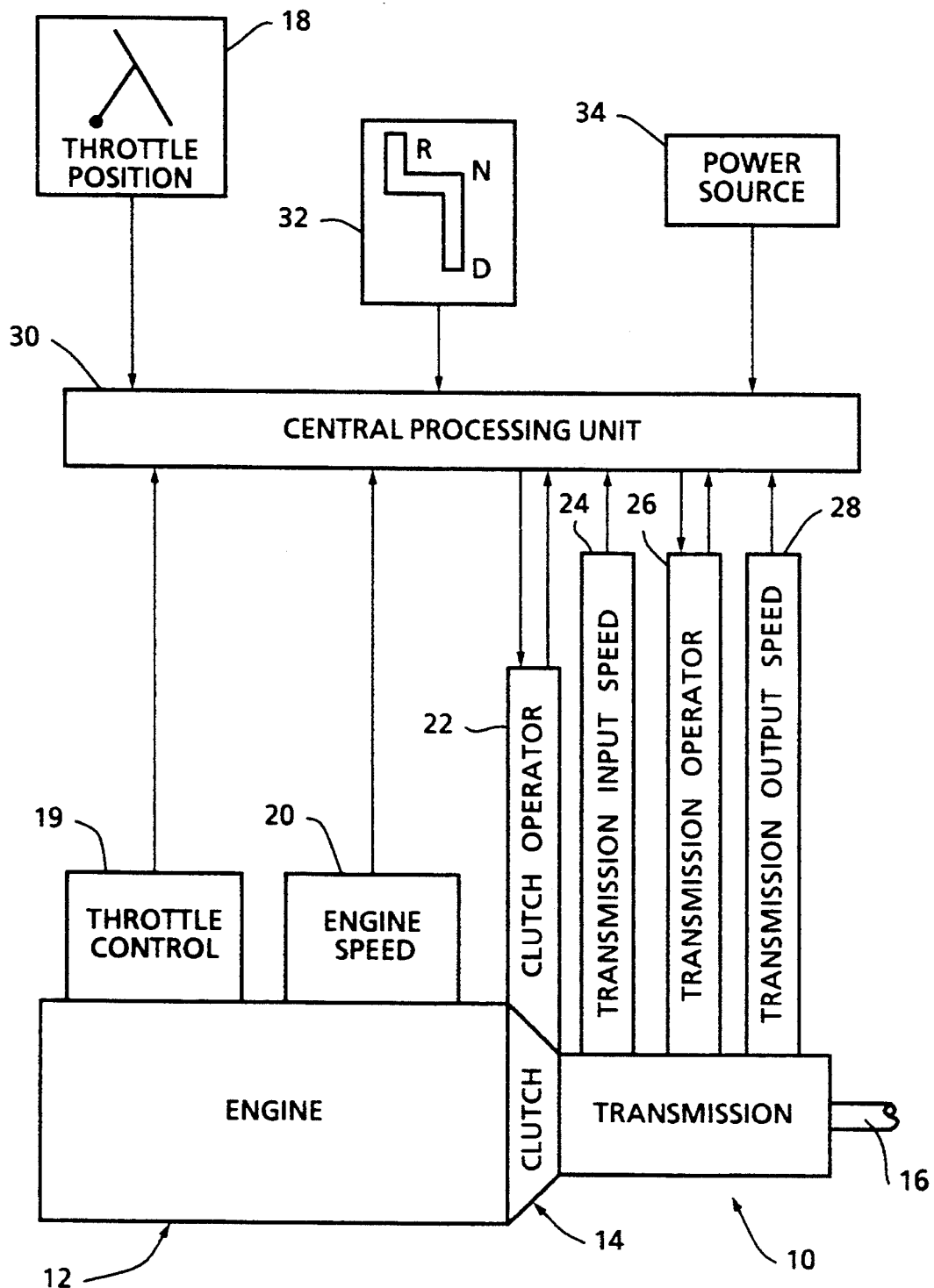
FIG. 1 is a schematic illustration of an automatic mechanical transmission system of the type advantageously utilizing the automatic clutch control system of the present invention.

In FIG. 1, an automatic mechanical transmission system, comprising an automatic multi-speed change gear transmission 10 driven by a throttle controlled heat engine 12, such as a well known diesel engine, through an automatically controlled master clutch 14 is illustrated. While the improved automatic master clutch control system/method of the present invention, to be described in greater detail below, is especially well suited for use in connection with automatic mechanical transmission systems of the type illustrated, it is understood that the automatic clutch control system of the present invention is also suitable for use with semi-automatic and/or manually shifted change gear transmissions and the like.

Typically, automatic mechanical transmission systems of the type illustrated are utilized with vehicles and the output of the automatic transmission 10 is output shaft 16, which is adapted for driving connection to an appropriate vehicle component such as the differential of a drive axle, a transfer case, or the like as is well known in the prior well. The above mentioned drive-train components are acted upon and monitored by several devices each of which will be discussed in greater detail below. These devices include a throttle position monitor assembly 18 which senses the position or setting of the operator controlled vehicle throttle pedal or other fuel throttling device, a throttle control device 19 which controls the supply of fuel to the engine, an engine speed sensor 20 which senses the rotational speed of the engine, a clutch operator or actuator 22 which engages and disengages master clutch 14, a transmission input shaft speed sensor 24, a transmission operator 26 which is effective to shift the transmission 10 into a selected gear ratio, and a transmission output shaft speed sensor 28.

The above mentioned devices supply information to and/or accept commands from a central processing unit 30. The central processing unit 30 may include analog and/or digital electronic calculation and logic circuitry, preferably microprocessor based, the specific configuration and structure of which, forms no part of the present invention. See for example, U.S. Pat. No. 4,595,986 the disclosure of which is incorporated herein by reference. The central processing unit also receives information from a shift control assembly 32 by which the operator may select a reverse (R), neutral (N) or forward (D) mode of operation of a vehicle. An electrical power source 34 and/or a source of pressurized fluid (not shown) provides electrical and/or pneumatic power to the various sensing, operating and/or processing units. Drive train components and controls therefor, of the type described above, are known in the prior art and may be appreciated in greater detail by reference to above mentioned U.S. Pat. Nos. 4,478,851; 4,019,614; 4,038,889; 4,081,065; 4,361,061 and 4,401,200.

In the illustrated embodiment, the central processing unit 30 receives direct inputs from sensor 20 indicating the present engine speed, from sensor 24 indicating the present transmission input shaft speed, from sensor 28 indicating the present transmission output shaft speed, from sensor 32 indicating the mode of operation selected by the vehicle operator, from clutch operator 22 indicating the condition of clutch 14 and from transmission operator 26 indicating the condition of transmission 10. In addition to these direct inputs, the central processing unit 30 may be provided with circuitry whereby the signal from sensor 18 may be differentiated to provide a calculated signal indicative of the rate of change of throttle position, a circuit for differentiating the input signal from sensor 20 to provide a calculated signal indicative of the rate of acceleration of the engine, a circuit for differentiating the signal from sensor 24 to provide a calculated signal indicative of the rate of acceleration of the input shaft, means to compare the input signals from sensors 24 and 28 to calculate a current engaged gear ratio, circuit means to compare the input signals from sensor 20 and sensor 24 to calculate slip across the clutch 14 and means to sense fill release of the throttle. Full release of the throttle may be sensed by a separate switch or the like or may be sensed by a minimum value (i.e. 0% of full throttle) signal from sensor 18. The central processing unit may also comprise memory means for storing current input and/or calculated information and means for clearing the memory means upon the occurrence of a predetermined event.

Sensors 18, 20, 24 and 28 and the sensors associated with operators 22 and 26, may be of any known type or construction for generating analog or digital signals proportional or indicative to the parameter monitored thereby. Similarly, operators 19, 22 and 26, may be of any known electrical, mechanical, pneumatic and/or hydraulic type for executing operations in response to command signals from processing unit 30.

As is known, the purpose of the central processing unit is to select, in accordance with a program, the optimal gear ratio at which the transmission should be operating and if necessary to command a gear change, or shift, into the selected optimal gear ratio based upon the current and/or stored information. The commands comprise commands to the transmission operator 26 to engage a desired gear ratio, to throttle control 19 to control the speed of the engine and to clutch operator 22 for proper operation of master clutch 14.

Figure 2:
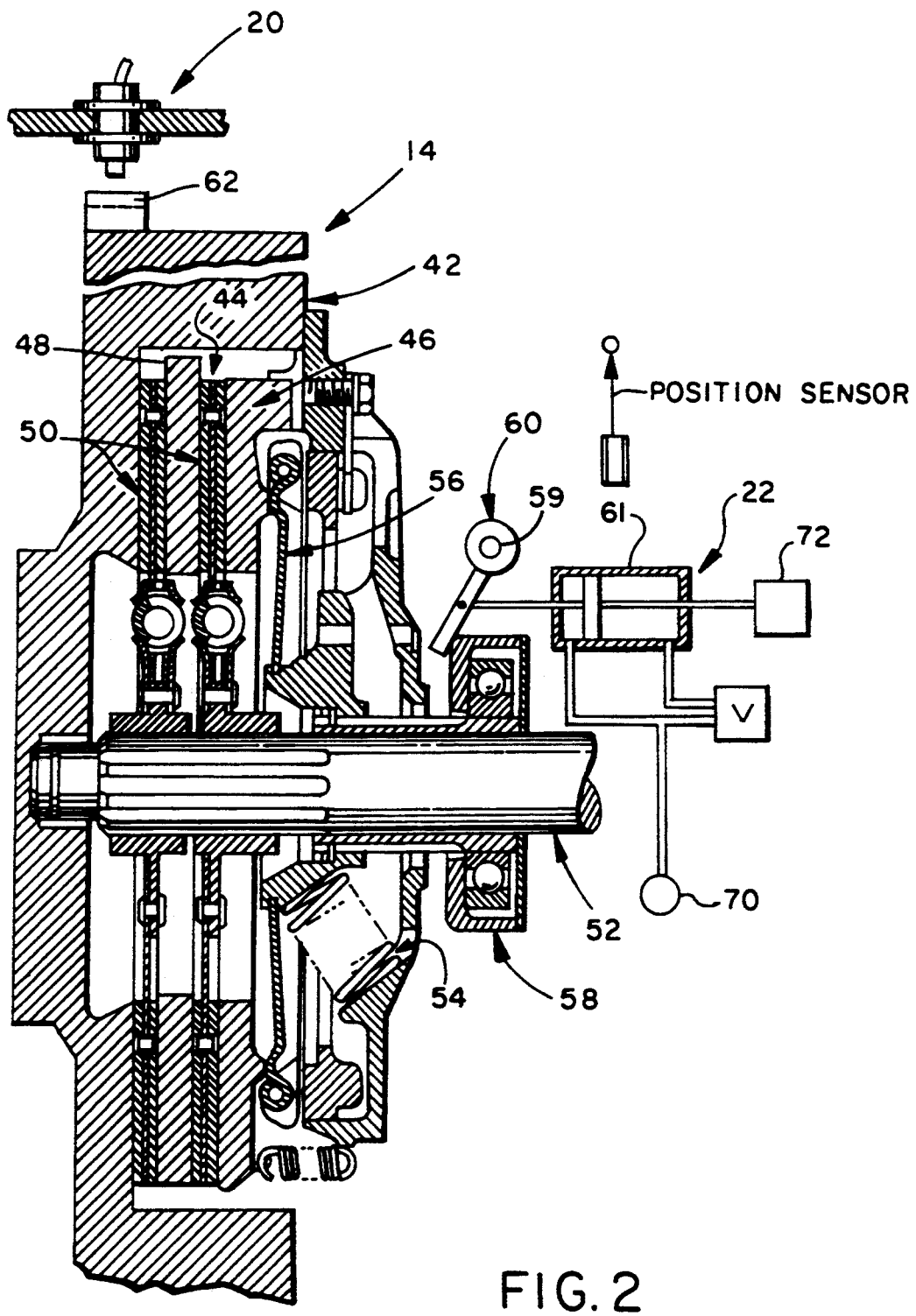
FIG. 2 is a cross-sectional view of a typical master friction clutch of the type automatically controlled by the present invention.

A typical master friction clutch 14 of the type to be automatically controlled by the automatic clutch control system of the present invention may be seen by reference to FIG. 2. It is understood, of course, that the specific construction of the clutch and actuator therefore are shown for illustrative purposes and that the control system of the present invention is suitable for use in connection with clutches and/or operators therefor of differing structure. Clutch 14 illustrated is a typical two plate mechanical spring applied clutch which is mounted to an engine fly wheel 42. Internal lugs 44 on the inner radius of the fly wheel 42 corresponds to slots in the clutch pressure plate 46 and intermediate plate 48 causing these elements to rotate at engine speed. They are, however, free to move in an axial direction. Clutch driven discs 50 are splined to the transmission input shaft 52. Clutch torque is provided by engaging springs 54 acting through levers 56 to apply a pressure to pressure plate 46. This pressure squeezes the driven discs 50 and intermediate plate 48 between the pressure plate 46 and the engine fly wheel 42. The magnitude of the clutch torque is proportional to this pressure.

The force provided by the spring 54 on the pressure plate 46 can be controlled by the axial position of the throw out bearing assembly 58. Throw out bearing assembly 58. Throw out bearing assembly 58 can be moved in the axial direction by a control lever 60 mounted on a shaft 59. The shaft 59 is mounted in a clutch housing such that pivotal movement of the clutch control lever 60 will cause an axial movement of the throw out bearing assembly 58. In this manner, movement of control lever 60 can vary the force on pressure plate 46 and therefore the available clutch torque. A magnetic pickup 20 is mounted in the clutch housing and detects tooth passage of the gear teeth 62 located on the outer radius of the engine fly wheel 42 to provide a signal proportional to engine speed.

Pivotal movement of the control lever 60 is controlled by a piston, cylinder and control valve assembly 61. Lever 60 and assembly 61 comprise the clutch actuator 22. Control valve V may, as disclosed in above-mentioned U.S. Pat. Nos. 4,081,065 and 4,361,060, comprise fine and course ports for modulated and rapid movement of lever 60. A sensor 70 for sensing clutch actuator pressure and/or a sensor 72 for sensing lever/piston position may be provided for providing input signals to CPU 30. Clutch 14 is in its fully engaged position when no rightward force is applied to the throwout bearing 58.

The automatic clutch control system of the present invention, when utilized in connection with an automatic mechanical transmission system, comprises a portion of the central processing unit 30. As indicated above, the clutch control system of the present invention may be separate and distinct from any transmission control devices. The central processing unit may utilize discrete logic components or a programmed by means of software and/or firmware) microprocessor. If a microprocessor is utilized, the discrete logic components/circuits, such as comparators, etc., are replaced by algorithm routines, etc., as is known in the prior art.

The automatic clutch control system of the present invention is provided to automatically control the master friction clutch 14 connecting engine 12 to a mechanical change gear transmission 10. Change gear transmissions are well known in the prior art and an example thereof may be seen by reference to U.S. Pat. No. 3,105,395, the disclosure of which is hereby incorporated by reference. The automatic clutch control system of the present invention controls operation of the clutch to engage and disengage same in accordance with certain current sensed, calculated and/or stored parameters and logic rules. The automatic clutch control system preferably will be similar to the clutch control systems illustrated and described in above mentioned U.S. Pat. Nos. 4,401,200; 4,361,060; 4,081,065; and/or 3,752,284.

The automatic clutch control will typically have several modes of operation, namely, a start from stop mode of operation wherein the clutch is engaged in a modulated manner and a gear change mode of operation when a vehicle transmission is shifted with the vehicle moving at above a given rate of speed. Typically, in the gear shift mode of operation, the master clutch is automatically caused to fully disengage at the initiation of a gear shift operation and automatically caused to fully reengage at the completion of a gear shift operation at a rate of travel and/or slip which may be modulated or unmodulated. A considerably greater degree of control, as is well known in the prior art, is required for operation of the clutch in the start from stop mode of operation.

Typically, in the start from stop mode of operation, the master clutch must be modulated between a fully disengaged and a fully engaged condition, or maintained at a predetermined partially engaged condition in accordance with certain parameters which usually include at least engine speed and throttle position, to achieve an acceptably smooth start without stalling of the vehicle engine. During a start from stop operation, the clutch is often maintained in a variably partially engaged condition, i.e. allowed a predetermined amount of slip, to maintain the engine speed and/or engine acceleration at above a predetermined value, which value is typically determined by engine idle speed and throttle position.

In the modulated modes of clutch engagement, especially in the start from stop mode of operation, the clutch 14 is utilized as an essential control element of the AMT system. As the clutch 14 can exercise no control over the system during that portion of engagement when it moves from the fully disengaged to the incipient engagement position, it is highly desirable to move the clutch as rapidly as possible between these positions during a modulated clutch engagement operation and to then control the degree of engagement of the clutch in a modulated manner, according to sensed, calculated and/or stored inputs and logic rules from the incipient engagement to fully engaged conditions thereof. As the sensing of actual incipient engagement of the clutch, and switching the actuator from the rapid unmodulated to the modulated modes of operation requires a period of time, it is highly desirable to have an accurate means to predict the conditions at which incipient engagement will occur, and to switch the actuator from the rapid unmodulated to the modulated mode of operation just prior to the occurrence of the predicted condition. To achieve the above, the control must have an accurate means to determine the clutch actuator 22 condition corresponding to the clutch incipient engagement condition.

To achieve proper improved control of the clutch, it is highly desirable to have control devices for, and a method of, periodically measuring the value of the monitored actuator parameter, or parameters, corresponding to incipient clutch engagement conditions. Preferably, this reference value will be measured and/or calculated (i.e. updated) at vehicle start up in a system calibration operation and will thereafter be updated until the next calibration operation.

A typical measurement or calibration operation may involve shifting of the transmission to neutral, confirming the neutral condition, waiting for transmission input shaft speed to fall below a predetermined value, applying an inertia brake or transmission input shaft brake with a predetermined force, and then slowly moving the clutch from full disengagement towards engagement until the sensed speed of the input shaft, or the sensed rate of change of input shaft speed, equals a predetermined value. At this point, the clutch will have reached incipient engagement conditions, and the control unit 30 will monitor and/or memorize the value of the monitored control parameters existing at that time. During such a calibration operation, the vehicle must be at a stop condition with the engine running and the transmission in neutral, and thus, such a calibration operation can only be undertaken at vehicle start up conditions or at widely spaced periodic intervals.

Figure 3:
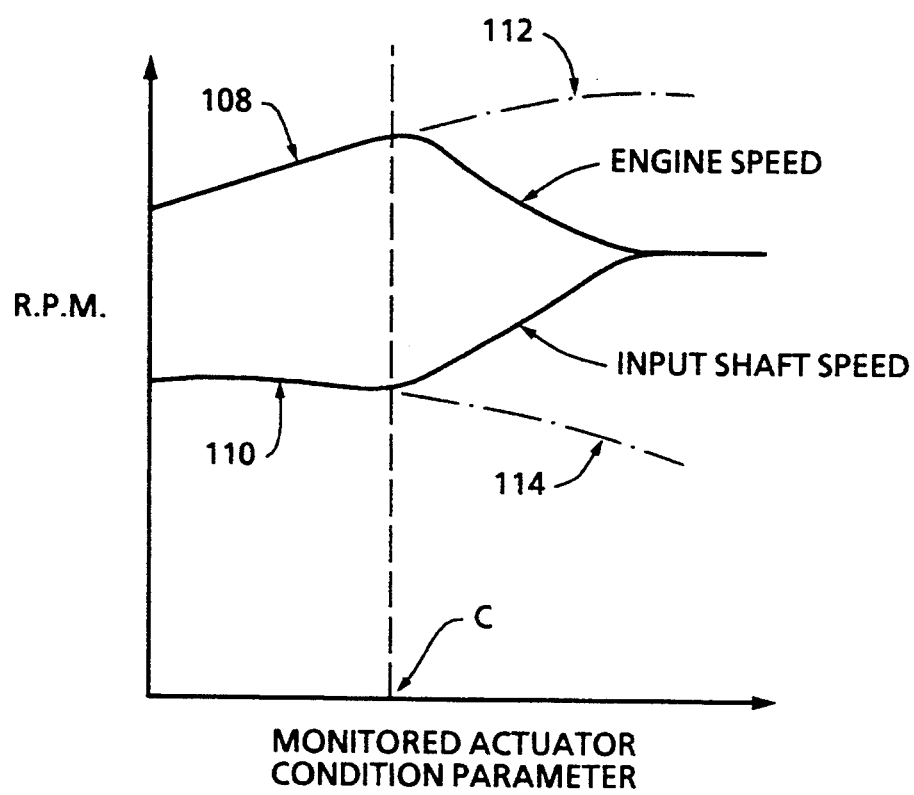
FIG. 3 is a graphical illustration of monitored system parameter values and monitored clutch actuator parameter values during a clutch engagement operation.

A prior art method of measuring, or calculating, the current value of the monitored clutch actuator parameter corresponding to incipient clutch engagement is graphically illustrated in FIG. 3 and described in above-mentioned U.S. Pat. No. 4,646,891. In FIG. 3, engine speed 108 and input shaft speed 110 are illustrated at various actuator condition parameter (lever position, actuator position, time of actuator initiation, etc.) values during a clutch engagement. Dotted lines 112 and 114, respectively, represent the expected values of engine speed and input shaft speed, respectively, in the absence of a clutch engagement. As may be seen, in a given time and at a value C of the monitored actuator condition parameter, the value, or the rate of change of the value, of the monitored system parameter, input shaft and/or engine speed, will change in a manner associated with (i.e. predicted for) incipient clutch engagement. Typically, the monitored change in value, or change in the rate of value, of the monitored system parameter will be compared to a reference change value. When the monitored change value equals the reference change value, the current monitored actuator condition parameter value, C, will be stored as the value corresponding to incipient clutch engagement. While such a calculation may be useful for determining a value of the monitored control parameter corresponding to incipient clutch engagement for the next clutch engagement operation, the procedure may not be especially useful for the currently engaged clutch operation especially if a relatively large period of time has passed since the last update of the monitored controlled parameter corresponding to incipient engagement over which period of time the operating temperature of the clutch has changed considerably. Further, if the clutch is operating in a nonmodulated mode determining an accurate value C may be difficult.

Figure 4:
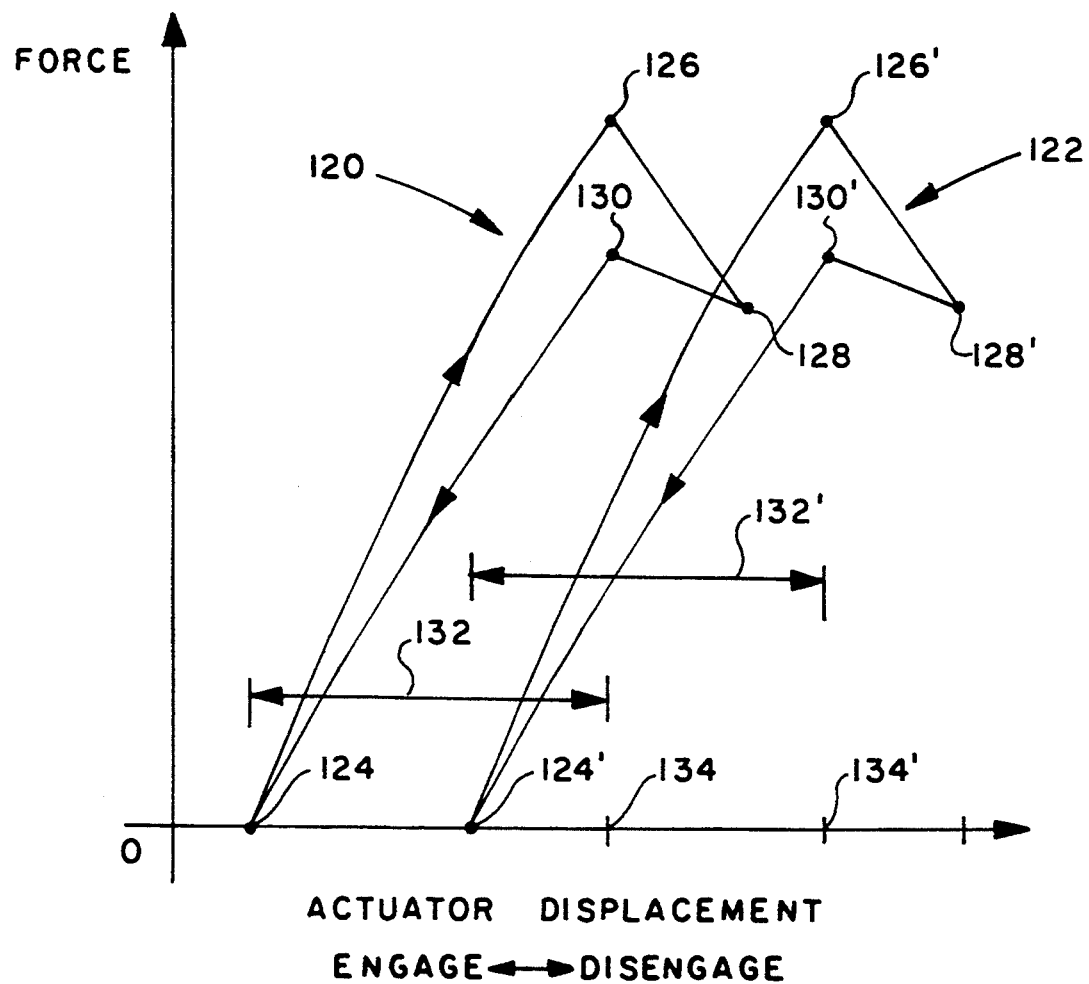
FIG. 4 is a graphical representation of clutch actuator displacement and forces on the clutch actuator at different clutch operating temperatures.

The basis for the improved clutch control method/system of the present invention may be seen by reference to FIG. 4. In FIG. 4, the force required to be applied to the clutch actuator to displace the clutch actuator for disengagement of the vehicle master clutch is illustrated for a relatively cold clutch by tracing 120 and for the same clutch, in a considerably warmer condition, by tracing 122. Referring to tracing 120, at point 124 the clutch actuator is in the fully nondisplaced condition and the clutch is fully engaged. To release the clutch, the actuator is displaced with a force which will increase to the level indicated at point 126 and will then slightly decrease to the level indicated at point 128 at which point the clutch is fully disengaged. To reengage the clutch, the actuator is returned to the nondisplaced condition thereof and the forces on the actuator will slightly increase to the level indicated at point 130 and will then decrease to zero force as indicated again at point 124. Point 130 is the point of incipient engagement. As may be seen by reference to tracing 122, where points 124', 126', 128'and 130' correspond to points 124, 126, 128 and 130 of tracing 120, the two tracings are substantially identical, although tracing 122 is shifted rightwardly on the graph of FIG. 4. What is important to note is that the change 132 in actuator position between point 124, full clutch engagement to point 130 the point of incipient clutch engagement, is substantially identical as the change in actuator position 132' between the full engagement point 124' and the incipient engagement point 130' of tracing 122. Accordingly, it may be noted, that the change in actuator displacement between full clutch engagement and the point of incipient engagement is relatively constant and independent of clutch operating temperature.

Based upon the above observation, according to the clutch control method/system of the present invention, when the value of the monitored control parameter corresponding to incipient clutch engagement is determined, the value of that monitored clutch parameter at full clutch disengagement is also determined as is the difference between these two values. Thereafter, the value of the clutch parameter corresponding to full clutch engagement 124' is easily determined on an ongoing basis and the updated value of the monitored clutch parameter corresponding to incipient engagement 130' is determined on the basis of the current value of the parameter corresponding to full clutch engagement 124' and the predetermined difference 132 in the value of that parameter between the full engaged and incipient engaged conditions as determined and memorized during the calibration operation.

Accordingly, a control 'method/system is provided for constantly updating the value of the monitored control parameter associated with clutch incipient engagement to adjust same for changes in clutch operating temperature and the like between full clutch system calibrations.

Although the present invention has been set forth with a certain degree of particularity, it is understood that various modifications, substitutions and/or rearrangements of the components are possible without departing from the spirit and the scope of the invention as hereinafter claimed.

We claim:

1. A method for determining an updated monitored control parameter value (134') indicative of an incipient engagement condition of a controlled vehicular master clutch (14), said method comprising;

at each occurrence of a predetermined event, performing a clutch calibration operation for determining initial values of said control parameter at clutch full engagement (124) and at clutch incipient engagement (134) and of the difference therebetween (132);

thereafter, determining said updated control parameter value (134') corresponding to incipient clutch engagement by (i) sensing a current value (124') of said control parameter at clutch full engagement and (ii) determining said updated control parameter value corresponding to incipient clutch engagement as a function of said current value (124') and said difference (132).

2. The method of claim 1 wherein said updated value equals the algebraic sum of said current value (124') and said difference (132).

3. The method of claim 2 wherein said control parameter is a parameter indicative of displacement of a clutch actuator (61).

4. The method of claim 1 wherein said control parameter is a parameter indicative of displacement of a clutch actuator (61).

5. A method for operating a control system for controlling a vehicular master friction clutch (14) as a function of a current clutch actuator (61) condition corresponding to clutch incipient engagement, said control system including sensors for providing input signals indicative of the condition of the actuator (61) and of the clutch (14), and means (30) for processing the signals according to predetermined logic rules and for issuing command output signals to at least said actuator, said actuator having a monitored variable parameter associated therewith which is determinative of the condition of said clutch, said method comprising;

at each occurrence of a predetermined event, performing a clutch calibration operation for determining on the basis of sensed inputs, initial values of said parameter indicative of actuator condition (i) at initial clutch fully engaged condition (124) and (ii) at initial clutch incipient engaged condition (134);

determining the value (132) of the difference between said initial values;

thereafter, (i) determining on the basis of currently sensed inputs the current value (124') of said parameter indicative of current clutch fully engaged condition, (ii) determining an updated value of said parameter (134') indicative of current clutch incipient engagement conditions as a function of said value (124') indicative of current clutch fully engaged condition and said difference (132) between initial values, and utilizing said updated value of said parameter indicative of current incipient engaged conditions to issue command outputs to said actuators.

6. The method of claim 5 wherein said updated value equals the algebraic sum of said current value (124') and said difference (132).

7. The method of claim 6 wherein said control parameter is a parameter indicative of displacement of a clutch actuator (61).

8. The method of claim 5 wherein said control parameter is a parameter indicative of displacement of a clutch actuator (61).

9. The method of claim 5 wherein said event is a vehicle start-up operation.

10. A control system for controlling a vehicular master friction clutch (14) as a function of a current clutch actuator (61) condition corresponding to clutch incipient engagement, said control system including sensors for providing input signals indicative of the condition of the actuator (61) and of the clutch (14), and means (30) for processing the signals according to predetermined logic rules and for issuing command output signals to at least said actuator, said actuator having a monitored variable parameter associated therewith which is determinative of the condition of said clutch, said system characterized by;

means for, at each occurrence of a predetermined event, performing a clutch calibration operation for determining on the basis of sensed inputs, initial values of said parameter indicative of actuator condition (i) at initial clutch fully engaged condition (124) and (ii) at initial clutch incipient engaged condition (134);

means for determining and memorizing the value (132) of the difference between said initial values; and for thereafter, (i) determining on the basis of currently sensed inputs the current value (124') of said parameter indicative of current clutch fully engaged condition, (ii) determining an updated value of said parameter (134') indicative of current clutch incipient engagement conditions as a function of said value (124') indicative of current clutch fully engaged condition and said difference (132) between initial values, and (iii) utilizing said updated value of said parameter indicative of current incipient engaged conditions to issue command outputs to said actuators.

11. The system of claim 10 wherein said updated value equals the algebraic sum of said current value (124') and said difference (132).

12. The system of claim 11 wherein said control parameter is a parameter indicative of displacement of a clutch actuator (61).

13. The system of claim 10 wherein said control parameter is a parameter indicative of displacement of a clutch actuator (61).

14. The system of claim 10 wherein said event is a vehicle start-up operation.

* * * * *